US012725773B2

(12) United States Patent
Kudo et al.

(10) Patent No.: US 12,725,773 B2
(45) Date of Patent: Sep. 1, 2026

(54) MASS SPECTROMETER

(71) Applicant: SHIMADZU CORPORATION, Kyoto (JP)

(72) Inventors: Tomoya Kudo, Kyoto (JP); Kohei Hosoo, Kyoto (JP)

(73) Assignee: SHIMADZU CORPORATION, Nishinokyo (JP)

( * ) Notice: Subject to any disclaimer, the term of this patent is extended or adjusted under 35 U.S.C. 154(b) by 219 days.

(21) Appl. No.: 18/726,849

(22) PCT Filed: Feb. 28, 2022

(86) PCT No.: PCT/JP2022/008217
§ 371 (c)(1),
(2) Date: Jul. 5, 2024

(87) PCT Pub. No.: WO2023/162203
PCT Pub. Date: Aug. 31, 2023

(65) Prior Publication Data

US 2025/0087475 A1 Mar. 13, 2025

(51) Int. Cl.
*H01J 49/24* (2006.01)

(52) U.S. Cl.
CPC .................................... *H01J 49/24* (2013.01)

(58) Field of Classification Search
CPC ...... H01J 49/24; H01J 49/044; H01J 49/0468; H01J 49/167; H01J 49/16
USPC .......................................................... 250/288
See application file for complete search history.

(56) References Cited

U.S. PATENT DOCUMENTS

| | | | | |
|---|---|---|---|---|
| 2015/0060566 A1 | 3/2015 | Nakano | | |
| 2021/0313163 A1 | 10/2021 | Okumura et al. | | |
| 2022/0319825 A1* | 10/2022 | Ishiguro | .............. | H01J 49/0036 |

FOREIGN PATENT DOCUMENTS

| | | |
|---|---|---|
| JP | 3187299 U | 11/2013 |
| JP | 6083361 B2 | 2/2017 |
| JP | 6136773 B2 | 5/2017 |
| JP | 6753533 B2 | 8/2020 |
| JP | 2021-089227 A | 6/2021 |

OTHER PUBLICATIONS

Written Opinion (ISA237) dated May 4, 2022, for PCT application No. PCT/JP2022/008217.

* cited by examiner

*Primary Examiner* — Kiet T Nguyen
(74) *Attorney, Agent, or Firm* — Muir Patent Law, PLLC

(57) ABSTRACT

A mass spectrometer includes an ion source unit including: a housing; a cover accommodating the housing; an enclosure accommodating the cover; a probe passing through the cover and housing to nebulize a liquid sample into the housing; a heated gas nozzle including a main body portion being hollow and located between the cover and the housing to discharge a gas heated by a heater in the main body portion into the housing; enclosure intake and exhaust ports; cover intake and exhaust ports; a first exhaust fan to discharge air flowing from the cover intake port and passing through the cover through the cover exhaust port; and a second exhaust fan to discharge air discharged into the enclosure from the cover exhaust port and air flowing from the enclosure intake port and passing through the enclosure, to an outside through the enclosure exhaust port.

7 Claims, 3 Drawing Sheets

MASS SPECTROMETER

TECHNICAL FIELD

The present invention relates to a mass spectrometer.

BACKGROUND ART

A mass spectrometer used in combination with a liquid chromatograph typically includes an ion source that ionizes components in a liquid sample eluted from the liquid chromatograph under a substantially atmospheric pressure, and a mass analyzer that performs mass spectrometry of ions generated in the ion source. As a method for ionizing components in a liquid sample under a substantially atmospheric pressure (i.e., an atmospheric pressure ionization method), an electrospray ionization (ESI) method, an atmospheric pressure chemical ionization (APCI) method, or the like is often used.

For example, an ion source that ionizes a sample by the ESI method includes a sample probe including a metal capillary through which a liquid sample flows and a nebulizer gas tube coaxially provided outside the capillary. The tip of the probe is inserted into an ion source housing under a substantially atmospheric pressure. In such an ion source, a liquid sample eluted from a column of a liquid chromatograph is guided to the capillary, and a high voltage of about several kV is applied to the tip of the capillary. A nebulizer gas flows through the nebulizer gas tube to nebulize the liquid sample. This generates charged droplets having the same polarity as the applied voltage. While the charged droplets are moving in the ion source, the solvent evaporates, and the surface electric field of the droplets augments, so that the charged droplets are split repeatedly due to repulsive force between charges. Finally, ions derived from sample components are generated.

For such an ion source, a mass spectrometer has been conventionally known that includes a heated gas nozzle that ejects a high temperature gas in order to promote vaporization of the solvent from charged droplets nebulized into the ion source (for example, see Patent Literature 1).

In the heated gas nozzle, gas (for example, dry air or nitrogen gas) of normal temperature is heated to about 400° C. to 500° C. by a heater, and then ejected into an ion source housing. This allows the high temperature gas to be blown to the charged droplets in the ion source, and the charged droplets are efficiently heated to promote the vaporization of the solvent. As a result, the ionization efficiency of sample components is enhanced, and more ions can be introduced into a mass analyzer, resulting in the improved analysis sensitivity.

CITATION LIST

Patent Literature

Patent Literature 1: JP 2021-089227 A

SUMMARY OF INVENTION

Technical Problem

In order to enhance the analysis sensitivity in the mass spectrometry as described above, it is effective to increase the heating temperature of the gas in the heated gas nozzle to enhance the desolvation efficiency. However, an increase in the temperature of the heater provided in the heated gas nozzle leads to an increase in the temperature of the sample probe due to radiation or thermal conduction from the heated gas nozzle, which causes a problem that the liquid sample boils in the probe, and the ionic intensity becomes unstable, and a problem that a portion that may be touched by a user, such as covers of the ion source and a base portion of the sample probe protruding from the covers, becomes high temperature. In addition, an increase in the temperature of the heated gas nozzle leads to thermal expansion of components of the mass analyzer due to the heat transferred to the mass analyzer, which causes deterioration of the mass accuracy due to a mass shift. In order to avoid such problems, it is conceivable to dispose a heat insulating material around the heated gas nozzle, around the probe, on entire surfaces of the covers covering the ion source, between the ion source and the mass analyzer, and the like. In this case, however, there is a problem that an increase in apparatus size and an increase in manufacturing cost are caused.

The present invention has been made in view of the above points, and an object of the present invention is to enhance desolvation efficiency while avoiding an increase in apparatus size and an increase in manufacturing cost, to prevent ionic intensity from being destabilized due to boiling of a sample, and to prevent a portion that may be touched by a user from becoming high temperature, in a mass spectrometer that ionizes a sample by an atmospheric pressure ionization method.

Solution to Problem

A mass spectrometer according to the present invention made to solve the above problems is a mass spectrometer including: an ion source unit configured to ionize a liquid sample; and an analysis unit including a vacuum chamber configured to perform mass spectrometry of an ion generated in the ion source unit, the ion source unit including:

an ion source housing which is a sealed container;

an ion source cover which accommodates the ion source housing;

an ion source enclosure which accommodates the ion source cover;

a probe which passes through the ion source cover and the ion source housing, the probe being configured to nebulize a liquid sample into the ion source housing;

a heated gas nozzle including a main body portion which is hollow and located between the ion source cover and the ion source housing, a heater configured to heat a gas passing through the main body portion, and a gas outlet tube configured to discharge a gas heated by the heater into the ion source housing;

an ion source enclosure intake port and an ion source enclosure exhaust port which are provided in the ion source enclosure;

an ion source cover intake port and an ion source cover exhaust port which are provided in the ion source cover;

a first exhaust fan configured to discharge air flowing into the ion source cover from the ion source cover intake port and passing through the ion source cover through the ion source cover exhaust port; and a second exhaust fan configured to discharge air discharged into the ion source enclosure from the ion source cover exhaust port and air flowing into the ion source enclosure from the ion source enclosure intake port and passing through the ion source enclosure, to an outside through the ion source enclosure exhaust port.

Advantageous Effects of Invention

The mass spectrometer according to the present invention having the above configuration may enhance desolvation efficiency while avoiding an increase in apparatus size and an increase in manufacturing cost, prevent ionic intensity from being destabilized due to boiling of a sample, and prevent a portion that may be touched by a user from becoming high temperature.

DESCRIPTION OF EMBODIMENTS

Figure 1:
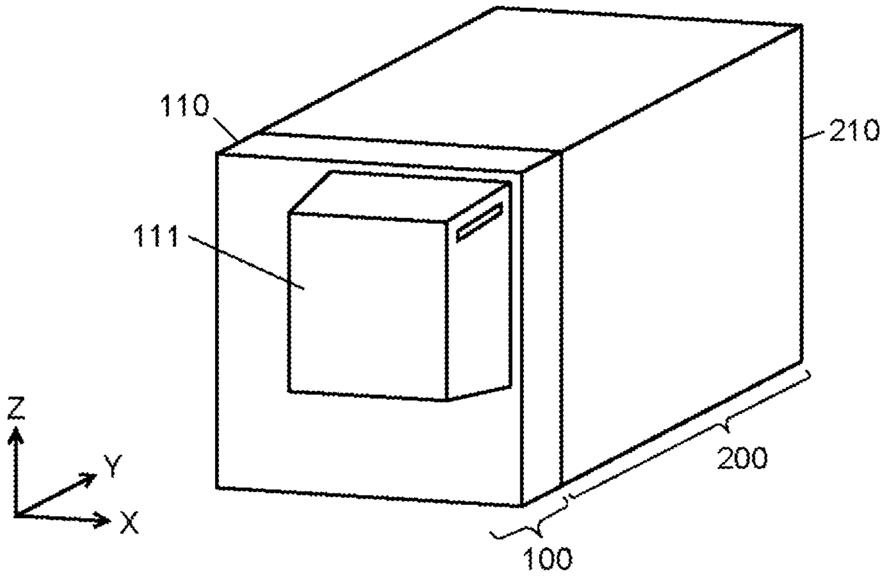
FIG. 1 is a perspective view illustrating a state in which a mass spectrometer according to an embodiment of the present invention is viewed from diagonally forward.
Figure 2:
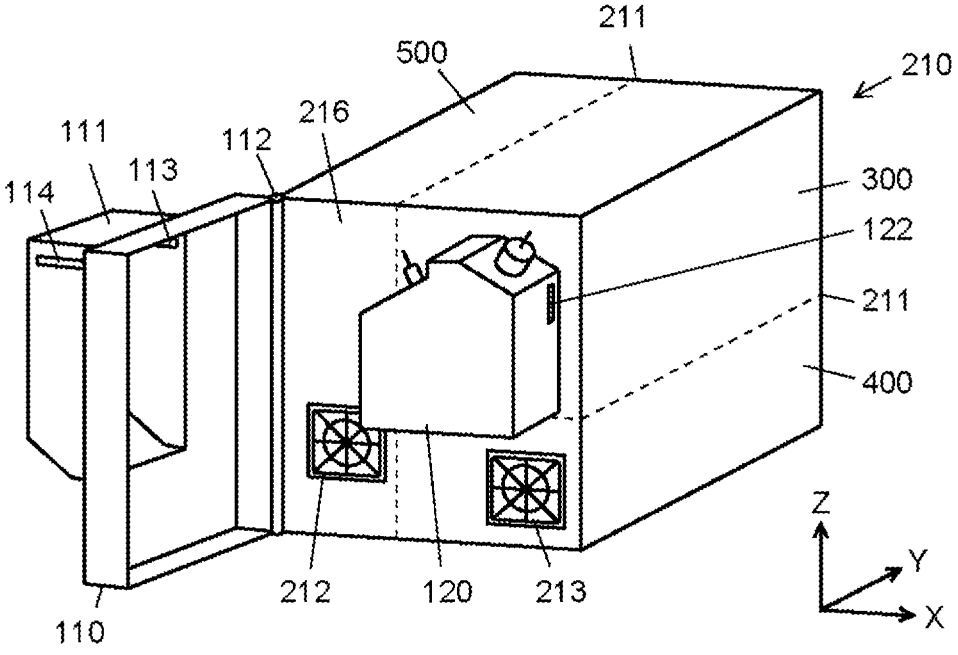
FIG. 2 is a perspective view illustrating a state in which a front cover of the mass spectrometer is opened.
Figure 3:
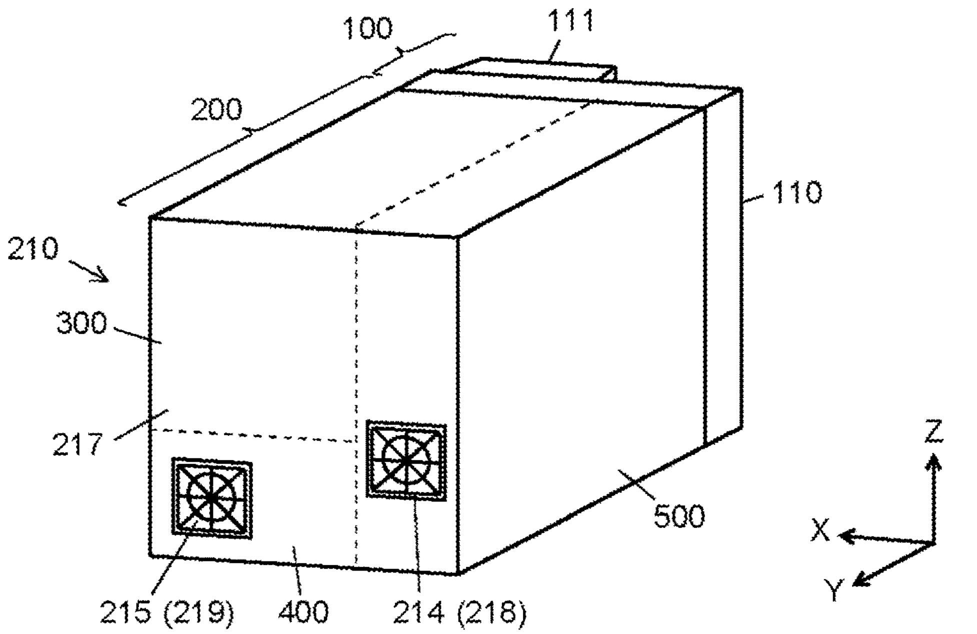
FIG. 3 is a perspective view illustrating a state in which the mass spectrometer is viewed from diagonally backward.
Figure 4:
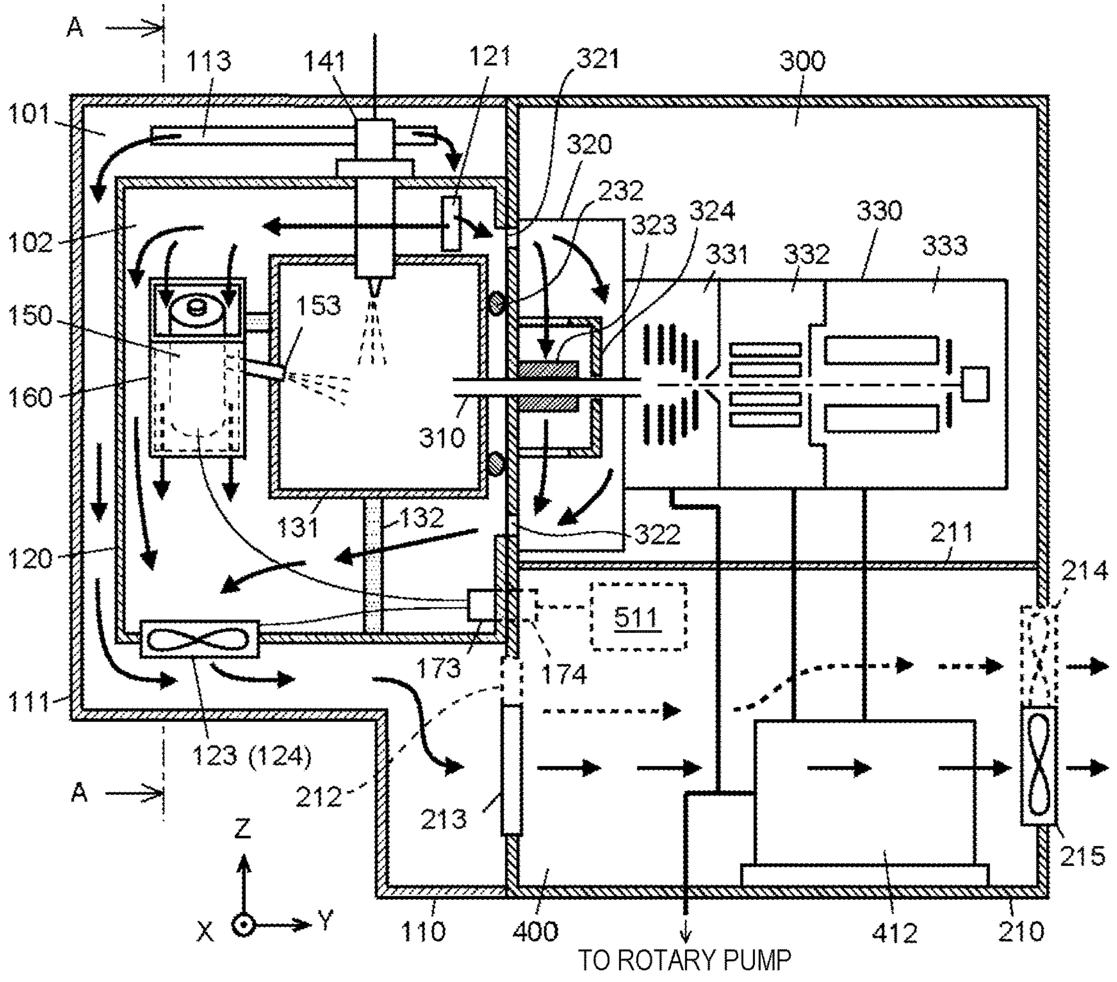
FIG. 4 is a lateral cross-sectional view of the mass spectrometer.
Figure 5:
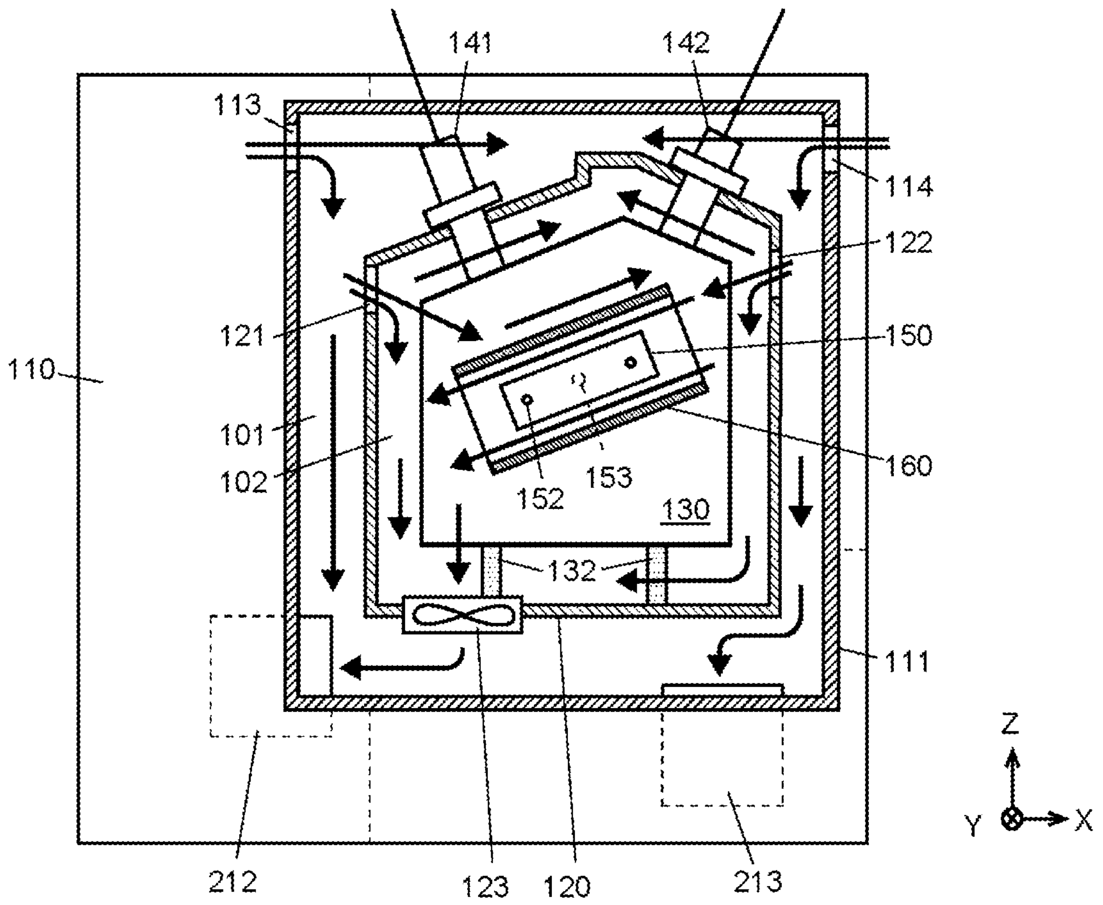
FIG. 5 is a cross-sectional arrow view taken along line A-A in FIG. 4.

A mass spectrometer according to an embodiment of the present invention will be described with reference to the attached drawings. FIGS. 1 to 3 are perspective views illustrating the appearance of the mass spectrometer according to the present embodiment, and FIGS. 4 and 5 are cross-sectional views of the mass spectrometer. For convenience of description, front-rear, up-down, and left-right directions are defined with the X direction in FIG. 1 as the right, the Y direction as the rear, and the Z direction as the up. The same applies to FIGS. 2 to 5. In addition, FIG. 4 is a schematic lateral cross-sectional view of the mass spectrometer as viewed from the right, and FIG. 5 is a cross-sectional arrow view taken along line A-A in FIG. 4. These cross-sectional views illustrate the internal structure of the mass spectrometer according to the present embodiment in an easily viewable manner, and illustrate a part of the internal structure in a simplified manner.

As illustrated in FIG. 1, the mass spectrometer according to the present embodiment has a substantially rectangular parallelepiped appearance long in the depth direction. An ion source unit 100 is disposed on the front side, and an analysis unit 200 is disposed on the rear side. The analysis unit 200 includes a rectangular parallelepiped enclosure (hereinafter referred to as analysis unit enclosure 210). The inside of the analysis unit enclosure 210 is partitioned into a vacuum chamber accommodating portion 300, a pump accommodating portion 400 (corresponding to "pump compartment" in the present invention), and a circuit and the like accommodating portion 500 (corresponding to "another compartment" in the present invention) by a partition 211.

The vacuum chamber accommodating portion 300 is disposed in an upper right portion in the analysis unit 200, and accommodates a substantially rectangular-parallelepiped vacuum chamber 330 and an interface section 320 provided in front of the vacuum chamber 330. The pump accommodating portion 400 is disposed under the vacuum chamber accommodating portion 300. A turbo-molecular pump 412 for evacuating the vacuum chamber 330 is disposed in the pump accommodating portion 400. The circuit and the like accommodating portion 500 is disposed on the left side of the vacuum chamber accommodating portion 300 and the pump accommodating portion 400. The circuit and the like accommodating portion 500 accommodates various electric circuits and the like.

The ion source unit 100 includes an ion source 130 disposed in front of the vacuum chamber accommodating portion 300, an ion source cover 120 that covers the ion source 130, and a front cover 110 that covers a front wall 216 of the analysis unit enclosure 210 (corresponding to "one side face of the analysis unit enclosure" in the present invention) and the ion source cover 120. An enclosure of the ion source 130 (hereinafter referred to as "ion source housing 131") and the ion source cover 120 need to be connected to ground from the viewpoint of electromagnetic compatibility and safety, and are thus made of a metal having electrical conductivity.

The ion source 130 performs ionization of a sample by an electrospray ionization (ESI) method, and includes the ion source housing 131, and a main probe 141 and a sub probe 142 for nebulizing a liquid sample into the ion source housing 131. The ion source housing 131 is attached to a front wall face of the interface section 320 by a seal member 232 such as an O-ring, and has a structure in which metal faces of the ion source housing 131 and the interface section 320 are not in contact with each other. This makes it possible to prevent the heat of the ion source housing 131 from being transferred to the vacuum chamber 330 through the interface section 320. Furthermore, the ion source cover 120 is fixed to the outside of the ion source housing 131 by a columnar spacer 132 by screwing or the like. As the spacer 132, one made of a low thermal conductive member coated with an electric conductive coating can be suitably used. Here, the low thermal conductive member is a member having thermal conductivity lower than the thermal conductivity of the ion source cover 120 and the ion source housing 131. For example, a resin such as polyamide 6 (PA6), polyether ether ketone (PEEK), polyacetal (POM), polyphenylene sulfide (PPS), polycarbonate (PC), or ABS can be used. In addition, as the electric conductive coating, for example, metal plating such as nickel plating, copper plating, or chromium plating, or metal vapor deposition such as aluminum vapor deposition can be used. This makes it possible to prevent the heat of the ion source housing 131 from being transferred to the ion source cover 120.

The ion source housing 131 is attached to the interface section 320 by a hinge (not illustrated) extending in the Z-axis direction, and is configured to be turnable around the hinge.

The front cover 110 is attached to the analysis unit enclosure 210 by a hinge 112 provided on the left side of the front wall 216 of the analysis unit enclosure 210, and is configured to be openable and closable by being turned around the hinge 112. In the present embodiment, the front cover 110 and the front wall 216 correspond to an "ion source enclosure" in the present invention. In the front cover 110, a region protruding forward is provided at a position corresponding to the ion source cover 120 (that is, an upper right portion), and the ion source cover 120 is accommodated inside the region. Hereinafter, the protruding region of the front cover 110 is referred to as ion source cover surrounding portion 111.

A tip portion of the main probe 141 for nebulizing a sample to be measured and a tip portion of the sub probe 142 for nebulizing a standard sample used for autotuning, calibration, and the like before analysis are inserted into the ion source 130. An outlet of a column 143 of a liquid chromatograph is connected to a base portion of the main probe 141, and a tube 144 for supplying the standard sample to the sub probe 142 is connected to a base portion of the sub probe 142. Furthermore, respective tubes (not illustrated) for supplying a nebulizer gas to the main probe 141 and the sub probe 142, and a power supply (not illustrated) for applying a voltage to the probes 141 and 142 are connected to the probes 141 and 142.

One end of a desolvation tube 310 that brings the internal space of the ion source housing 131 and the vacuum chamber 330 (described later) provided in the vacuum chamber accommodating portion 300 into communication with each other is further inserted into the ion source 130. The desolvation tube 310 extends in the depth direction. The main probe 141 and the sub probe 142 are disposed such that the nebulizing axis of each of the probes 141 and 142 (the central axis in the traveling direction of charged droplets nebulized from each of the probes 141 and 142) and the central axis of the desolvation tube 310 are orthogonal to each other in the ion source 130. Specifically, the main probe 141 is attached to an upper left portion of the ion source housing 131 in a state of being inclined so as to nebulize charged droplets from the diagonally upper left with respect to the central axis of the desolvation tube 310, and the sub probe 142 is attached to an upper right portion of the ion source housing 131 in a state of being inclined so as to nebulize charged droplets from the diagonally upper right with respect to the central axis of the desolvation tube 310.

In front of the ion source 130, a heated gas nozzle 150 that blows a heated gas to the charged droplets nebulized from the main probe 141 or the sub probe 142 from forward, and a reflector 160 surrounding the heated gas nozzle 150 are disposed.

Figure 6:
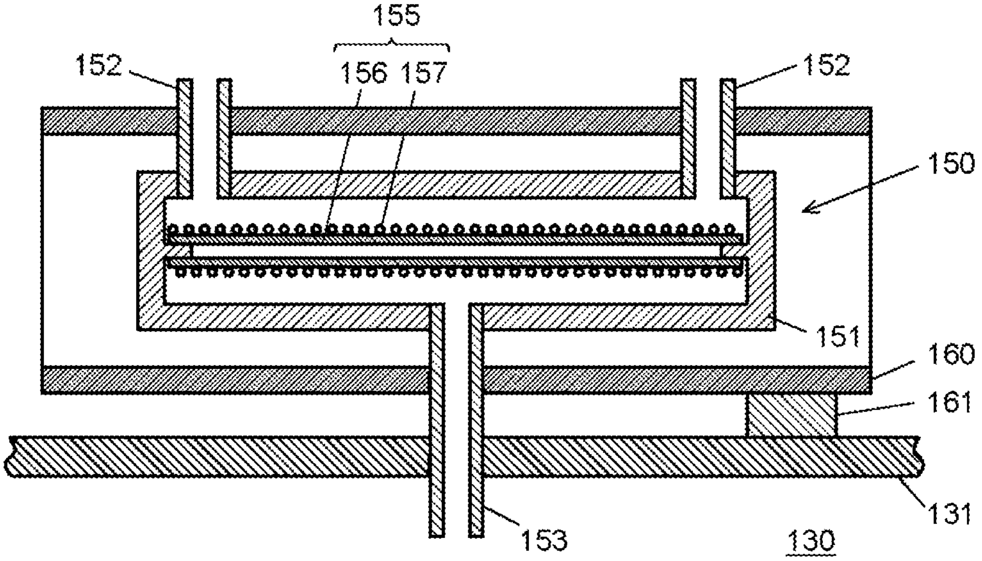
FIG. 6 is an enlarged cross-sectional view illustrating a heated gas nozzle and its surrounding region in the mass spectrometer.

As illustrated in FIG. 6, the heated gas nozzle 150 includes a cylindrical main body portion 151 whose opposite ends are closed, a heater 155 accommodated in the main body portion 151, two gas inlet tubes 152 protruding from a peripheral face near the opposite ends of the main body portion 151, and a gas outlet tube 153 protruding from a peripheral face near the longitudinal center of the main body portion 151. The main body portion 151, the gas inlet tubes 152, and the gas outlet tube 153 are made of a metal such as stainless steel, for example. The gas inlet tubes 152 and the gas outlet tube 153 are disposed at positions different from each other in the circumferential direction of the main body portion 151. The respective internal spaces of the gas inlet tubes 152 and the gas outlet tube 153 communicate with the internal space of the main body portion 151. The heater 155 is formed by winding an electric heating wire 157 in a coil shape around the outer periphery of a tubular core member 156 having an outer diameter smaller than the inner diameter of the main body portion 151. The core member 156 is made of, for example, ceramics, and is fixed to the main body portion 151 by protrusions provided on inner surfaces of opposite end walls of the main body portion 151 being inserted into end portions of the core member 156.

A tube (not illustrated) leading to a gas cylinder filled with an assist gas such as dry air or nitrogen gas, for example, is connected to the gas inlet tubes 152. The gas outlet tube 153 passes through the reflector 160 and a front wall of the ion source housing 131, and its tip is located in the vicinity of the tips of the main probe 141 and the sub probe 142 in the ion source 130.

The opposite ends of the electric heating wire 157 provided in the heater 155 of the heated gas nozzle 150 are respectively connected to electrodes provided on the opposite end walls of the main body portion 151. The electrodes are connected to a primary connector 173 provided on a back wall of the ion source cover 120 through wiring. On the other hand, a secondary connector 174 is provided on the front wall 216 of the analysis unit enclosure 210 at a position corresponding to the primary connector 173. The secondary connector is connected to a power supply 511 accommodated in the analysis unit enclosure 210 through wiring. In a state where the ion source cover 120 is disposed in front of the analysis unit 200 as illustrated in FIG. 4, the primary connector 173 and the secondary connector 174 are fitted to each other, and the heater 155 is connected to the power supply 511. On the other hand, when the back wall of the ion source cover 120 is separated from the front wall 216 of the analysis unit enclosure 210 by turning the ion source cover 120 and the ion source housing 131 around the above-described hinge (not illustrated), the primary connector 173 is detached from the secondary connector 174, and the connection between the heater 155 and the power supply 511 is released.

The reflector 160 is a heat reflecting member for reflecting heat radiated from the main body portion 151 of the heated gas nozzle 150 and returning the heat to the main body portion 151, and is made of a metal having a low radiation rate and excellent heat resistance, such as aluminum, stainless steel, iridium, or platinum, for example. The reflector 160 has a rectangular tubular shape with open opposite ends, and is fixed to the ion source housing 131 by a spacer 161 made of a low thermal conductive member coated with an electric conductive coating, by screwing or the like. Here, the low thermal conductive member constituting the spacer 161 is a member having thermal conductivity lower than the thermal conductivity of the reflector 160 and the ion source housing 131. For example, a resin such as polyamide 6 (PA6), PEEK, POM, PPS, PC, or ABS can be used. In addition, as the electric conductive coating, for example, metal plating such as nickel plating, copper plating, or chromium plating, or metal vapor deposition such as aluminum vapor deposition can be used. Inside the reflector 160, the main body portion 151 of the heated gas nozzle 150 is accommodated with its central axis parallel to the central axis of the reflector 160. The diameter of the main body portion 151 is smaller than an interval between inner wall faces facing each other of the reflector 160, whereby a gap through which air passes is formed between an outer peripheral face of the main body portion 151 and an inner peripheral face of the reflector 160. In addition, the main body portion 151 of the heated gas nozzle 150 and the reflector 160 are disposed such that their respective central axes are orthogonal to the Y axis and are inclined with respect to the X axis and the Z axis. Specifically, the main body portion 151 and the reflector 160 are attached to the outside of the front wall of the ion source housing 131 with their one ends being directed to the diagonally upper right and the other ends being directed to the diagonally lower left.

As illustrated in FIG. 4, the vacuum chamber 330 is partitioned into three chambers: a first intermediate vacuum chamber 331, a second intermediate vacuum chamber 332, and an analysis chamber 333, sequentially from forward along the depth direction (Y-axis direction). The first intermediate vacuum chamber 331, the second intermediate vacuum chamber 332, and the analysis chamber 333 have a configuration of a differential exhaust system that is exhausted such that the degree of vacuum increases stepwise by the turbo-molecular pump 412 disposed in the pump accommodating portion 400 and a rotary pump disposed outside the analysis unit enclosure 210. The first intermediate vacuum chamber 331 and the second intermediate vacuum chamber 332 communicate with each other, and the second intermediate vacuum chamber 332 and the analysis chamber 333 communicate with each other, through an opening provided in a partition separating them. An ion guide for transporting ions to the subsequent stage while converging the ions is installed in each of the first intermediate vacuum chamber 331 and the second intermediate vacuum chamber 332. An ion separator such as a quadrupole mass filter and an ion detector are installed in the analysis chamber 333.

The interface section 320 is a region located between the first intermediate vacuum chamber 331 and the ion source 130. The desolvation tube 310 described above is disposed so as to pass through the interface section 320 and have its front end located in the ion source 130 and its rear end located in the vacuum chamber 330. In the internal space of the interface section 320, a second heater 323 is provided around the desolvation tube 310. The second heater 323 heats the desolvation tube 310 to a predetermined temperature. The second heater 323 includes a substantially columnar heated block formed of a metal (for example, aluminum) having high thermal conductivity, and a heater that heats the heated block. A through hole is formed in the longitudinal direction of the heated block, and the desolvation tube 310 is inserted so as to come into contact with an inner peripheral face of the through hole. A second reflector 324 that reflects heat radiated from the second heater 323 and returns the heat to the second heater 323 is provided around the second heater 323. The second reflector 324 is formed by bending a plate made of a metal having a low radiation rate and excellent heat resistance, such as aluminum, stainless steel, iridium, or platinum, for example. The plate is provided with a cutout for allowing air flowing in the interface section 320 to pass.

An analysis operation in the mass spectrometer of the present embodiment will be briefly described. When a liquid sample (a sample to be measured or a standard sample) is supplied to the main probe 141 or the sub probe 142, a nebulizer gas and the liquid sample are released from the tip of the probe 141 or 142, and the liquid sample thus atomized is nebulized into the ion source 130. At this time, a voltage is applied to the main probe 141 or the sub probe 142, so that the liquid sample is nebulized while being given biased charges, and sample components are ionized in the process of vaporization of a solvent in the nebulized charged droplets.

In addition, in order to promote the vaporization of the solvent (that is, desolvation) from the charged droplets, a heated gas is introduced into the ion source 130 as described below. First, an assist gas at room temperature is supplied from the gas cylinder (not illustrated), and flows into the main body portion 151 through the two gas inlet tubes 152 provided in the heated gas nozzle. In the main body portion 151, the assist gas is heated by the heat generated by the heater 155. The heated gas heated to a predetermined temperature is discharged from the gas outlet tube 153 and introduced into the ion source 130.

Ions generated in the ion source 130 in this manner are carried in gas flow formed by a pressure difference between the opposite ends of the desolvation tube 310 to be sucked into the desolvation tube 310. At this time, even in a case where the charged droplet in which the solvent is not sufficiently vaporized is sucked into the desolvation tube, desolvation proceeds in the desolvation tube 310 heated to a high temperature by the second heater, and ionization is promoted.

The ions sent to the first intermediate vacuum chamber 331 of the vacuum chamber 330 through the desolvation tube 310 in this manner pass through the first intermediate vacuum chamber 331 and the second intermediate vacuum chamber 332 while being converged by the ion guides, and are introduced into the analysis chamber 333. In the analysis chamber 333, only ions having specific m/z are allowed to pass or the m/z of ions allowed to pass is scanned within a predetermined range by the ion separator such as a quadrupole mass filter, and the ions that have passed through the ion separator are detected by the ion detector.

As described above, blowing the heated gas to the charged droplets in the ion source 130 can promote the desolvation from the charged droplets to enhance the ionization efficiency. In order to enhance the analysis sensitivity in such mass spectrometry, it is necessary to increase the temperature of the heated gas to enhance the desolvation efficiency. However, an increase in the temperature of the heater provided in the main body portion 151 leads to an increase in the temperature of the main probe 141 and the sub probe 142 due to radiation or thermal conduction from the main body portion 151, which causes a problem that the liquid sample boils in the probes 141 and 142, and the ionic intensity becomes unstable, or a problem that a portion that may be touched by a user, such as the ion source cover 120 and base portions of the main probe 141 and the sub probe 142 protruding from the ion source cover 120, becomes high temperature. In addition, an increase in the temperature of the ion source cover 120 or the ion source housing 131 leads to thermal expansion of components of the vacuum chamber 330 due to the heat transferred to the vacuum chamber 330 through the interface section 320, which causes deterioration of the mass accuracy due to a mass shift. In order to avoid such problems, the mass spectrometer according to the present embodiment is provided with a mechanism for air-cooling the ion source unit 100 and the interface section 320.

Hereinafter, an air cooling mechanism of the ion source unit 100, which is a characteristic configuration of the present embodiment, will be described.

In the ion source cover surrounding portion 111 of the front cover 110, slit-shaped opening portions extending in the front-rear direction (Y-axis direction) are formed in upper portions of its right side face and its left side face. Hereinafter, between the opening portions, one provided in the left side face is referred to as front cover first intake port 113, and one provided in the right side face is referred to as front cover second intake port 114. The front cover first intake port 113 and the front cover second intake port 114 correspond to an ion source enclosure intake port in the present invention.

In the ion source cover 120, slit-shaped opening portions extending in the up-down direction (Z-axis direction) are formed in upper portions of its right side face and its left side face. Hereinafter, between the opening portions, one provided in the left side face is referred to as ion source cover first intake port 121, and one provided in the right side face is referred to as ion source cover second intake port 122. The ion source cover first intake port 121 and the ion source cover second intake port 122 correspond to an ion source cover intake port in the present invention. Furthermore, an ion source cover exhaust port 124 that is an opening portion is formed at a left end of a lower face of the ion source cover 120. A fan for discharging air in the ion source cover 120 is provided in the ion source cover exhaust port 124. Hereinafter, the fan is referred to as ion source cover exhaust fan 123. The ion source cover exhaust fan 123 corresponds to a first exhaust fan in the present invention. The ion source cover exhaust fan 123 is connected to the above-described primary connector 173 through wiring, and the ion source cover exhaust fan 123 and the power supply 511 are connected or disconnected as the ion source cover 120 and the ion source housing 131 are turned.

Two opening portions that bring the inside and the outside of the analysis unit enclosure 210 into communication with each other are provided in a region other than the region where the ion source cover 120 is attached in the front wall 216 of the analysis unit enclosure 210. One of the two opening portions is located in front of the circuit and the like accommodating portion 500, and the other is located in front of the pump accommodating portion 400. Hereinafter, between the opening portions, one provided on the circuit and the like accommodating portion 500 side is referred to as circuit and the like accommodating portion intake port 212 (corresponding to an "ion source enclosure exhaust port" in the present invention), and one provided on the pump accommodating portion 400 side is referred to as pump accommodating portion intake port 213 (corresponding to a "pump compartment intake port" in the present invention).

In a back wall 217 of the analysis unit enclosure 210 (corresponding to a "side face facing one side face of the analysis unit enclosure" in the present invention), opening portions for discharging air in the analysis unit enclosure 210 are provided at positions corresponding to the back side of the circuit and the like accommodating portion 500 and the back side of the pump accommodating portion 400. A fan is attached to each of the opening portions. Hereinafter, among the opening portions and fans, those provided on the circuit and the like accommodating portion 500 side are referred to as circuit and the like accommodating portion exhaust port 218 and circuit and the like accommodating portion exhaust fan 214, and those provided on the pump accommodating portion 400 side are referred to as pump accommodating portion exhaust port 219 and pump accommodating portion exhaust fan 215. Among them, the circuit and the like accommodating portion exhaust port 218 corresponds to "another compartment exhaust port" in the present invention, and the circuit and the like accommodating portion exhaust fan 214 corresponds to a second exhaust fan in the present invention. In addition, the pump accommodating portion exhaust port 219 corresponds to a "pump compartment exhaust port" in the present invention, and the pump accommodating portion exhaust fan 215 corresponds to a third exhaust fan in the present invention.

The circuit and the like accommodating portion intake port 212 and the pump accommodating portion intake port 213 are covered with filters for preventing entry of foreign matter such as dust.

Furthermore, in a boundary portion between the ion source cover 120 and the analysis unit enclosure 210, two opening portions that bring the internal space of the ion source cover 120 and the internal space of the interface section 320 into communication with each other are provided in a region located in front of the interface section 320. The opening portions are provided at substantially vertically symmetrical positions across the desolvation tube 310. Hereinafter, between the opening portions, an upper opening portion is referred to as interface intake port 321, and a lower opening portion is referred to as interface exhaust port 322. The interface intake port 321 corresponds to a first ventilation port in the present invention, and the interface exhaust port 322 corresponds to a second ventilation port in the present invention.

In the present embodiment, the area of the opening portion for taking air into the mass spectrometer (that is, the sum of the opening areas of the front cover first intake port 113 and the front cover second intake port 114) is desirably ½ or less of the area of the opening portion for discharging air from the mass spectrometer to the outside (that is, the sum of the opening areas of the circuit and the like accommodating portion exhaust fan 214 and the pump accommodating portion exhaust fan 215). This makes it possible to increase the flow velocity of air passing through the mass spectrometer to come into contact with the main probe 141, the sub probe 142, the ion source cover 120, and the like, and makes it possible to enhance the air cooling efficiency.

By operating the ion source cover exhaust fan 123, the circuit and the like accommodating portion exhaust fan 214, and the pump accommodating portion exhaust fan 215 described above, a flow of air passing through the inside of the mass spectrometer according to the present embodiment is formed.

Specifically, air is taken into the front cover 110 from the front cover first intake port 113 and the front cover second intake port 114. A part of the air taken into the front cover 110 enters a space (referred to as first space 101) between an inner wall face of the front cover 110 and an outer wall face of the ion source cover 120, flows through the space 101, and is then discharged from the first space 101 through the circuit and the like accommodating portion intake port 212 or the pump accommodating portion intake port 213. In the above process, the air flowing through the first space 101 cools the outer wall face of the ion source cover 120 and a portion of the main probe 141 and the sub probe 142 exposed to the first space 101.

In addition, the remaining part of the air taken into the first space 101 from the front cover first intake port 113 and the front cover second intake port 114 is taken into the ion source cover 120 from the ion source cover first intake port 121 and the ion source cover second intake port 122. The air taken into the ion source cover 120 flows through a space (referred to as second space 102) between an inner wall face of the ion source cover 120 and an outer wall face of the ion source housing 131, and is discharged from the second space 102 through the ion source cover exhaust fan 123. This allows the air flowing through the second space 102 to cool the inner wall face of the ion source cover 120, the outer wall face of the ion source housing 131, and a portion of the main probe 141 and the sub probe 142 exposed to the second space 102.

Furthermore, a part of the air entering the second space 102 from the ion source cover first intake port 121 hits an outer wall face of the reflector 160 disposed in an inclined position, and travels to the diagonally upper right along the outer wall face. In this process, the outer wall face of the reflector 160 is cooled. The air that has reached the upper end (right end portion) of the reflector 160 flows into a gap between an inner wall face of the reflector 160 and an outer wall face of the heated gas nozzle 150 together with a part of the air entering the second space 102 from the ion source cover second intake port 122, and travels through the gap to the lower left. In this process, the inner face of the reflector 160 and the outer peripheral face of the heated gas nozzle

150 are air-cooled. After that, the air passing through the gap is discharged from the second space 102 through the ion source cover exhaust fan 123.

In addition, a part of the air taken into the second space 102 from the ion source cover first intake port 121 and the ion source cover second intake port 122 is taken into the interface section 320 from the interface intake port 321, flows through the inside of the interface section 320, and is then discharged from the interface exhaust port 322 to the second space 102. In this process, the air flowing in the interface section 320 cools the second heater 323 and the second reflector 324. The air discharged from the interface exhaust port 322 to the second space 102 is discharged from the second space 102 by the ion source cover exhaust fan 123.

The air discharged from the second space 102 to the first space 101 by the ion source cover exhaust fan 123 is taken into the analysis unit enclosure 210 from the circuit and the like accommodating portion intake port 212 located in the vicinity of the ion source cover exhaust fan 123. On the other hand, in the air taken into the first space 101 from the front cover first intake port 113 and the front cover second intake port 114, a part of the air not taken into the second space 102 is taken into the analysis unit enclosure 210 (specifically, the inside of the pump accommodating portion 400) from the pump accommodating portion intake port 213. As described above, the ion source cover exhaust fan 123 is disposed in the vicinity of the intake port (that is, the circuit and the like accommodating portion intake port 212) provided in a region where the vacuum pump is not disposed (that is, in the circuit and the like accommodating portion 500), which makes it possible to prevent the relatively high temperature air having passed through the second space 102 (or the second space 102 and the interface section 320) from coming into contact with the turbo-molecular pump 412 to increase the failure rate of the pump.

The air (indicated by a dotted arrow in FIG. 4) taken into the analysis unit enclosure 210 from the circuit and the like accommodating portion intake port 212 passes through the inside of the circuit and the like accommodating portion 500, and is discharged from the circuit and the like accommodating portion exhaust fan 214 to the outside of the analysis unit enclosure 210. On the other hand, the air taken into the analysis unit enclosure 210 from the pump accommodating portion intake port 213 passes through the inside of the pump accommodating portion 400, and is discharged from the pump accommodating portion exhaust fan 215 to the outside of the analysis unit enclosure 210.

As described above, the mass spectrometer according to the present embodiment is provided with the above-described air cooling mechanism, so that it is possible to efficiently cool the ion source cover 120 by generating a flow of air outside and inside the ion source cover 120. In addition, according to the above-described air cooling mechanism, the portion of the main probe 141 and the sub probe 142 protruding from the ion source housing 131 and the interface section 320 can be efficiently cooled by the relatively low temperature air before contact with the heated gas nozzle 150. As a result, even in a case where the temperature of the heated gas is increased in order to enhance the desolvation efficiency, it is possible to prevent the ionic intensity from being destabilized due to boiling of the liquid sample in the probes 141 and 142, and to prevent a portion that may be touched by a user from becoming high temperature, without using a large heat insulating material. In addition, by cooling the interface section 320, heat generated in the ion source unit 100 and the interface section 320 can be prevented from being transferred to the vacuum chamber 330, and the mass stability can be improved.

In addition, in the mass spectrometer according to the present embodiment, the periphery of the heated gas nozzle is surrounded by the reflector, so that it is possible to prevent radiation from the heated gas nozzle to the main probe, the sub probe, and the ion source cover. In addition, by air-cooling the reflector as described above, it is also possible to prevent radiation from the reflector to the main probe, the sub probe, and the ion source cover. In addition, the configuration in which the heated gas nozzle is cooled by the wind passing through the gap between the outer face of the heated gas nozzle and the inner face of the reflector makes it possible to enhance the cooling efficiency by increasing the flow velocity of the air in contact with the heated gas nozzle as compared with a case where the reflector 160 is not provided. In addition, the air passing between the reflector 160 and the heated gas nozzle 150 flows from the upper right to the lower left along the inner face of the reflector 160 and the outer face of the heated gas nozzle, and is discharged to the outside of the second space 102 through the ion source cover exhaust fan 123 provided in the lower left portion of the ion source cover 120. Therefore, it is possible to enhance the air cooling efficiency by preventing the air heated to a high temperature by contact with the heated gas nozzle 150 from coming into contact with the probes 141 and 142.

Although the embodiment of the present invention is described with specific examples, the present invention is not limited to such an embodiment, and an appropriate change in the scope of the present invention is acceptable. For example, in the above embodiment, the ion source 130 is provided with the two probes: the main probe 141 and the sub probe 142. However, the present invention is not limited to this configuration, and the ion source 130 may be provided with only one probe, and the probe may switchingly nebulize the sample to be measured and the standard sample.

In addition, in the above embodiment, the ion source 130 that ionizes the sample by the electrospray ionization (ESI) method is used. However, the ion source is not limited to this configuration as long as the ion source ionizes the sample by atmospheric pressure ionization. For example, the ion source may ionize the sample by an atmospheric pressure chemical ionization (APCI) method. In this case, a corona discharge electrode is provided in the ion source housing, and a mechanism for applying a voltage to the corona discharge electrode is provided instead of the mechanism for applying a voltage to the main probe 141 or the sub probe 142. Alternatively, instead of the ion source 130 in the above embodiment, a dual ion source-type ion source that simultaneously performs ionization by the ESI method and ionization by the APCI method may be provided. In this case, a corona discharge electrode is provided in the ion source housing 131, and both the mechanism for applying a voltage to the probe 141 or 142 and a mechanism for applying a voltage to the corona discharge electrode are provided.

In addition, the structure of the heated gas nozzle 150 is not limited to that described in the above embodiment, and various forms can be adopted. For example, in the above embodiment, the electric heating wire 157 constituting the heater 155 is wound around the core member 156. However, the present invention is not limited to this configuration, and can adopt a configuration in which the electric heating wire 157 is fixed to an inner face of a peripheral wall of the main body portion 151, embedded in the peripheral wall, wound around the outer periphery of the peripheral wall, or the like. In addition, the electric heating wire 157 is not limited to the coil shape, and can have various shapes. In addition, in the above embodiment, the assist gas before heating is caused to flow into the main body portion 151 from two positions in the vicinity of the opposite ends of the peripheral wall of the main body portion 151, and the assist gas after heating is discharged from the intermediate portion of the peripheral wall. However, the present invention is not limited to this configuration, and the assist gas before heating may be caused to flow into the main body portion 151 from one position in the vicinity of one end of the peripheral wall, and the assist gas after heating may be discharged from the vicinity of the other end of the peripheral wall.

In addition, in the above embodiment, the air between the front cover 110 and the front wall 216 of the analysis unit enclosure 200 is discharged to the outside of the mass spectrometer through the analysis unit 200 (specifically, the circuit and the like accommodating portion 500) by the function of the circuit and the like accommodating portion exhaust fan 214, which is a component corresponding to the second exhaust fan according to the present invention. However, the present invention is not limited to this configuration, and the second exhaust fan according to the present invention may be disposed, for example, at a lower portion of the front cover 110, so that the air between the front cover 110 and the front wall 216 of the analysis unit enclosure 200 is discharged without passing through the analysis unit 200.

[Modes]

It is understood by those skilled in the art that the plurality of exemplary embodiments described above are specific examples of the following modes.

(Clause 1) A mass spectrometer according to one mode of the present invention is a mass spectrometer including: an ion source unit configured to ionize a liquid sample; and an analysis unit including a vacuum chamber configured to perform mass spectrometry of an ion generated in the ion source unit, the ion source unit including:

an ion source housing which is a sealed container;

an ion source cover which accommodates the ion source housing;

an ion source enclosure which accommodates the ion source cover;

a probe which passes through the ion source cover and the ion source housing, the probe being configured to nebulize a liquid sample into the ion source housing;

a heated gas nozzle including a main body portion which is hollow and located between the ion source cover and the ion source housing, a heater configured to heat a gas passing through the main body portion, and a gas outlet tube configured to discharge a gas heated by the heater into the ion source housing;

an ion source enclosure intake port and an ion source enclosure exhaust port which are provided in the ion source enclosure;

an ion source cover intake port and an ion source cover exhaust port which are provided in the ion source cover;

a first exhaust fan configured to discharge air flowing into the ion source cover from the ion source cover intake port and passing through the ion source cover through the ion source cover exhaust port; and a second exhaust fan configured to discharge air discharged into the ion source enclosure from the ion source cover exhaust port and air flowing into the ion source enclosure from the ion source enclosure intake port and passing through the ion source enclosure, to an outside through the ion source enclosure exhaust port.

According to the mass spectrometer described in clause 1, it is possible to efficiently cool the ion source cover and the probe by generating a flow of air outside and inside the ion source cover. As a result, even in a case where the temperature of the heater of the heated gas nozzle is increased in order to enhance the desolvation efficiency, it is possible to prevent the ionic intensity from being destabilized due to boiling of the liquid sample in the probe, and to prevent a portion that may be touched by a user from becoming high temperature.

(Clause 2) In a mass spectrometer according to clause 1, in the ion source cover, the heated gas nozzle may be located on a flow path of air from the ion source cover intake port to the ion source cover exhaust port, and the probe may be located on an upstream side of the heated gas nozzle on the flow path.

According to the mass spectrometer described in clause 2, a portion of the probe protruding from the ion source housing inside the ion source cover can be efficiently cooled by relatively low temperature air before contact with the heated gas nozzle.

(Clause 3) A mass spectrometer according to clause 1 may further include:

an interface section which is hollow and located between the ion source unit and the vacuum chamber;

a desolvation tube, one end of which opens into the ion source housing, and another end of which opens into the vacuum chamber, an intermediate portion between the one end and the another end being located in the interface section;

a first ventilation port configured to allow a part of air flowing into the ion source cover from the ion source cover intake port to flow into the interface section; and a second ventilation port which is provided closer to the first exhaust fan than the first ventilation port, the second ventilation port being configured to allow air flowing into the interface section from the first ventilation port and passing through the interface section to flow back into the ion source cover, in which the first ventilation port may be provided closer to the ion source enclosure intake port than the second ventilation port.

According to the mass spectrometer described in clause 3, it is possible to cool the interface section by generating a flow of air in the interface section. As a result, heat generated in the ion source unit or the interface section can be prevented from being transferred to the vacuum chamber, and the mass stability can be improved.

(Clause 4) A mass spectrometer according to clause 1 may further include a reflector which has a tubular shape with open opposite ends, and accommodates the main body portion of the heated gas nozzle, in which a gap may be provided between an outer face of the main body portion and an inner face of the reflector.

According to the mass spectrometer described in clause 4, since the main body portion of the heated gas nozzle is surrounded by the reflector, radiation from the main body portion to the probe and the ion source cover can be prevented. In addition, the reflector can be cooled by air passing through the gap between the main body portion and the reflector, and radiation from the reflector to the probe and the ion source cover can also be prevented. In addition, the configuration in which the heated gas nozzle is cooled by the wind passing through the gap between the main body portion and the reflector makes it possible to enhance the cooling efficiency by increasing the flow velocity of the air in contact with the heated gas nozzle as compared with a case where no reflector is provided.

(Clause 5) In a mass spectrometer according to clause 1, the analysis unit may include an analysis unit enclosure divided into a pump compartment which accommodates a vacuum pump configured to evacuate the vacuum chamber, and another compartment, the ion source housing and the ion source cover may be attached to one side face of the analysis unit enclosure, the ion source enclosure may include the one side face of the analysis unit enclosure and an openable and closable cover which covers the one side face and the ion source cover, the mass spectrometer may include:

a pump compartment intake port which is provided in the one side face of the analysis unit enclosure, and communicates with the pump compartment;

another compartment exhaust port and a pump compartment exhaust port which are provided in a side face facing the one side face of the analysis unit enclosure, the another compartment exhaust port communicating with the another compartment, and the pump compartment exhaust port communicating with the pump compartment; and a third exhaust fan configured to discharge air flowing into the pump compartment from the pump compartment intake port and passing through the pump compartment, to an outside through the pump compartment exhaust port, the ion source enclosure exhaust port may be an opening portion provided in the one side face of the analysis unit enclosure and communicating with the another compartment, the second exhaust fan may discharge air flowing into the another compartment from the ion source enclosure exhaust port and passing through the another compartment, to an outside through the another compartment exhaust port, and the ion source cover exhaust port may be provided at a position closer to the ion source enclosure exhaust port than the pump compartment intake port.

According to the mass spectrometer described in clause 5, most of relatively high temperature air discharged from the ion source cover exhaust port can be discharged to the outside through the compartment of the analysis unit enclosure which does not accommodate the vacuum pump. Therefore, it is possible to prevent an increase in the failure rate of the vacuum pump due to an increase in the temperature of the compartment which accommodates the vacuum pump.

(Clause 6) In a mass spectrometer according to clause 1, the ion source cover may be fixed to the ion source housing by a spacer made of a low thermal conductive member coated with an electric conductive coating.

According to the mass spectrometer described in clause 6, it is possible to avoid heat transfer from the ion source housing to the ion source cover while supporting the ion source cover by the ion source housing.

(Clause 7) In a mass spectrometer according to clause 4, the reflector may be fixed to the ion source housing by a spacer made of a low thermal conductive member coated with an electric conductive coating.

According to the mass spectrometer described in clause 7, it is possible to avoid heat transfer from the reflector to the ion source housing while supporting the reflector by the ion source housing.

REFERENCE SIGNS LIST

100 . . . Ion Source Unit
101 . . . First Space
102 . . . Second Space
110 . . . Front Cover
111 . . . Ion Source Cover Surrounding Portion
113 . . . Front Cover First Intake Port
114 . . . Front Cover Second Intake Port
120 . . . Ion Source Cover
121 . . . Ion Source Cover First Intake Port
122 . . . Ion Source Cover Second Intake Port
123 . . . Ion Source Cover Exhaust Fan
124 . . . Ion Source Cover Exhaust Port
130 . . . Ion Source
131 . . . Ion Source Housing
141 . . . Main Probe
142 . . . Sub Probe
150 . . . Heated Gas Nozzle
151 . . . Main Body Portion
152 . . . Gas Inlet Tube
153 . . . Gas Outlet Tube
155 . . . Heater
160 . . . Reflector
200 . . . Analysis Unit
210 . . . Enclosure
212 . . . Circuit and the Like Accommodating Portion Intake Port
213 . . . Pump Accommodating Portion Intake Port
214 . . . Circuit and the Like Accommodating Portion Exhaust Fan
215 . . . Pump Accommodating Portion Exhaust Fan
300 . . . Vacuum Chamber Accommodating Portion
310 . . . Desolvation Tube
320 . . . Interface Section
321 . . . Interface Intake Port
322 . . . Interface Exhaust Port
323 . . . Second Heater
324 . . . Second Reflector
330 . . . Vacuum Chamber
400 . . . Pump Accommodating Portion
412 . . . Turbo-Molecular Pump
500 . . . Circuit and the Like Accommodating Portion
511 . . . Power Supply

The invention claimed is:

1. A mass spectrometer comprising: an ion source unit configured to ionize a liquid sample; and an analysis unit including a vacuum chamber configured to perform mass spectrometry of an ion generated in the ion source unit, the ion source unit including:

an ion source housing which is a sealed container;

an ion source cover which accommodates the ion source housing;

an ion source enclosure which accommodates the ion source cover;

a probe which passes through the ion source cover and the ion source housing, the probe being configured to nebulize a liquid sample into the ion source housing;

a heated gas nozzle including a main body portion which is hollow and located between the ion source cover and the ion source housing, a heater configured to heat a gas passing through the main body portion, and a gas outlet tube configured to discharge a gas heated by the heater into the ion source housing;

an ion source enclosure intake port and an ion source enclosure exhaust port which are provided in the ion source enclosure;

an ion source cover intake port and an ion source cover exhaust port which are provided in the ion source cover;

a first exhaust fan configured to discharge air flowing into the ion source cover from the ion source cover intake port and passing through the ion source cover through the ion source cover exhaust port; and a second exhaust fan configured to discharge air discharged into the ion source enclosure from the ion source cover exhaust port and air flowing into the ion source enclosure from the ion source enclosure intake port and passing through the ion source enclosure, to an outside through the ion source enclosure exhaust port.

2. The mass spectrometer according to claim 1, wherein in the ion source cover, the heated gas nozzle is located on a flow path of air from the ion source cover intake port to the ion source cover exhaust port, and the probe is located on an upstream side of the heated gas nozzle on the flow path.

3. The mass spectrometer according to claim 1, further comprising:

an interface section which is hollow and located between the ion source unit and the vacuum chamber;

a desolvation tube, one end of which opens into the ion source housing, and another end of which opens into the vacuum chamber, an intermediate portion between the one end and the another end being located in the interface section;

a first ventilation port configured to allow a part of air flowing into the ion source cover from the ion source cover intake port to flow into the interface section; and a second ventilation port which is provided closer to the first exhaust fan than the first ventilation port, the second ventilation port being configured to allow air flowing into the interface section from the first ventilation port and passing through the interface section to flow back into the ion source cover, wherein the first ventilation port is provided closer to the ion source enclosure intake port than the second ventilation port.

4. The mass spectrometer according to claim 1, further comprising a reflector which has a tubular shape with open opposite ends, and accommodates the main body portion of the heated gas nozzle, wherein a gap is provided between an outer face of the main body portion and an inner face of the reflector.

5. The mass spectrometer according to claim 4, wherein the reflector is fixed to the ion source housing by a spacer made of a low thermal conductive member coated with an electric conductive coating.

6. The mass spectrometer according to claim 1, wherein the analysis unit includes an analysis unit enclosure divided into a pump compartment which accommodates a vacuum pump configured to evacuate the vacuum chamber, and another compartment, the ion source housing and the ion source cover are attached to one side face of the analysis unit enclosure, the ion source enclosure includes the one side face of the analysis unit enclosure and an openable and closable cover which covers the one side face and the ion source cover, the mass spectrometer includes:

a pump compartment intake port which is provided in the one side face of the analysis unit enclosure, and communicates with the pump compartment;

another compartment exhaust port and a pump compartment exhaust port which are provided in a side face facing the one side face of the analysis unit enclosure, the another compartment exhaust port communicating with the another compartment, and the pump compartment exhaust port communicating with the pump compartment; and a third exhaust fan configured to discharge air flowing into the pump compartment from the pump compartment intake port and passing through the pump compartment, to an outside through the pump compartment exhaust port, the ion source enclosure exhaust port is an opening portion provided in the one side face of the analysis unit enclosure and communicating with the another compartment, the second exhaust fan discharges air flowing into the another compartment from the ion source enclosure exhaust port and passing through the another compartment, to an outside through the another compartment exhaust port, and the ion source cover exhaust port is provided at a position closer to the ion source enclosure exhaust port than the pump compartment intake port.

7. The mass spectrometer according to claim 1, wherein the ion source cover is fixed to the ion source housing by a spacer made of a low thermal conductive member coated with an electric conductive coating.

* * * * *